(12) United States Patent
Tu et al.

(10) Patent No.: US 11,734,163 B2
(45) Date of Patent: *Aug. 22, 2023

(54) MACHINE LEARNING MODEL FULL LIFE CYCLE MANAGEMENT FRAMEWORK

(71) Applicant: Tencent America LLC, Palo Alto, CA (US)

(72) Inventors: Min Tu, Cupertino, CA (US); Shangqing Zhang, San Jose, CA (US); Tao Yang, Mountain View, CA (US); Yaliang Li, Santa Clara, CA (US); Nan Du, Santa Clara, CA (US); Yusheng Xie, Mountain View, CA (US); Wei Fan, New York, NY (US)

(73) Assignee: TENCENT AMERICA LLC, Palo Alto, CA (US)

( * ) Notice: Subject to any disclaimer, the term of this patent is extended or adjusted under 35 U.S.C. 154(b) by 195 days.

This patent is subject to a terminal disclaimer.

(21) Appl. No.: 17/186,679

(22) Filed: Feb. 26, 2021

(65) Prior Publication Data

US 2021/0232497 A1    Jul. 29, 2021

Related U.S. Application Data

(63) Continuation of application No. 16/277,057, filed on Feb. 15, 2019, now Pat. No. 11,030,086.

(51) Int. Cl.
*G06F 11/36* (2006.01)
*G06N 20/00* (2019.01)

(52) U.S. Cl.
CPC ...... *G06F 11/3688* (2013.01); *G06F 11/3664* (2013.01); *G06F 11/3676* (2013.01); *G06F 11/3692* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 10,275,710 B1* | 4/2019 | Teredesai | G06K 9/6232 |
| 10,719,301 B1* | 7/2020 | Dasgupta | G06K 9/6267 |
| 2009/0106178 A1 | 4/2009 | Chu | |
| 2015/0286556 A1* | 10/2015 | Ellis | G06F 11/3688 |
| | | | 717/125 |
| 2016/0300156 A1* | 10/2016 | Bowers | G06F 16/2465 |
| 2017/0178019 A1* | 6/2017 | Duggan | G06F 8/60 |
| 2017/0178027 A1* | 6/2017 | Duggan | G06F 9/543 |
| 2017/0213132 A1 | 7/2017 | Hammond et al. | |
| 2017/0213156 A1 | 7/2017 | Hammond et al. | |
| 2017/0308800 A1* | 10/2017 | Cichon | G06N 20/00 |
| 2019/0279109 A1* | 9/2019 | Guelman | G06F 16/285 |

(Continued)

OTHER PUBLICATIONS

International Search Report and Written Opinion dated May 13, 2020, issued by the International Searching Authority in application No. PCT/US2020/017664.

*Primary Examiner* — Philip Wang
(74) *Attorney, Agent, or Firm* — Sughrue Mion, PLLC

(57) ABSTRACT

A method and apparatus are provided that includes, in a same framework, storing an artificial intelligence (AI) model, loading the AI model into a serving platform, loading and testing a test unit against the AI model loaded into the serving platform, and collecting reports from results of storing the AI model, loading the AI model into the serving platform and testing the test unit.

20 Claims, 4 Drawing Sheets

(56) References Cited

U.S. PATENT DOCUMENTS

| | | | | |
|---|---|---|---|---|
| 2019/0340095 A1* | 11/2019 | Faibish | ................ | G06F 11/302 |
| 2019/0340113 A1* | 11/2019 | Earanti | ............... | G06F 11/3688 |
| 2019/0384699 A1* | 12/2019 | Arbon | .................... | G06N 3/006 |
| 2019/0385043 A1* | 12/2019 | Choudhary | ............. | G06N 3/084 |
| 2019/0391956 A1* | 12/2019 | Kozhaya | ............. | G06F 16/3329 |
| 2019/0392351 A1* | 12/2019 | Zuluaga | ................ | G06F 21/552 |
| 2020/0175416 A1* | 6/2020 | Zhao | ...................... | G06N 20/00 |
| 2020/0202171 A1* | 6/2020 | Hughes | ................. | G06N 7/005 |
| 2022/0156168 A1* | 5/2022 | Panikkar | ............... | G06F 11/277 |
| 2023/0029218 A1* | 1/2023 | Bhamidipaty | ........ | G06F 18/217 |

\* cited by examiner

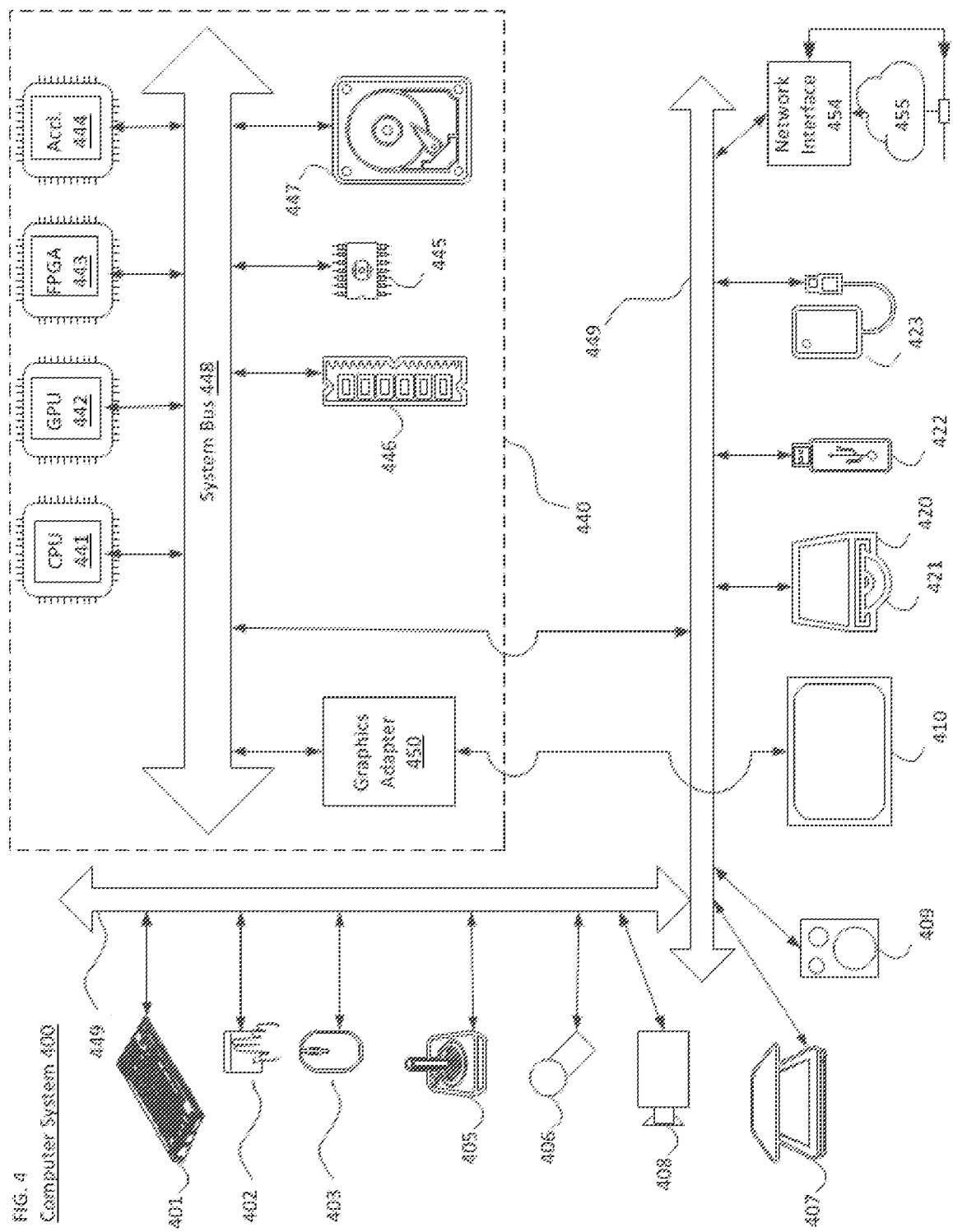

MACHINE LEARNING MODEL FULL LIFE CYCLE MANAGEMENT FRAMEWORK

This application is a Continuation of U.S. application Ser. No. 16/277,057, filed Feb. 15, 2019, the contents of which are incorporated herein by reference in their entirety.

BACKGROUND

1. Field

The disclosed subject matter relates to a novel framework in which machine learning models may be trained with different algorithms using different platforms and managed for a full life cycle.

2. Description of Related Art

Previously, there has not been a singular framework which could manage full life cycles of machine learning models. Thus, error prone manual steps are performed to discover, load, unload, test, and monitor the artificial intelligence (AI) models for example.

Currently, TensorFlow provides its own serving platform in an open-source manner. For example, TensorFlow Serving is an open-source software library for serving machine learning models. That library deals with inference aspects of machine learning and may provide clients with versioned access via a high-performance, reference-counted lookup table. Multiple models, or indeed multiple versions of the same model, can be served simultaneously, and TensorFlow Serving has out-of-the-box support for TensorFlow models.

Although TensorFlow Serving has out-of-the-box support for TensorFlow models, TensorFlow Serving however lacks support for machine learning models trained by other platforms (Café, Torch, etc.). Also, TensorFlow Serving only provides the serving functionality for machine learning models and not for a full life cycle management.

Accordingly, technical solutions are desired to address technical problems in which model owners may not have a clear and thorough view of the model and may be subject to human errors in AI model management which may also prevent data scientists from focusing on model training due to such errors.

SUMMARY

In view of the lack for support for machine learning models trained by other platforms and for full life cycle management, the disclosed subject matter herein represents instead a novel framework providing full life cycle management of the machine learning models, including model persistence services, out-of-the-box model serving functionality for models trained by various platforms, of course, including TensorFlow, model testing services and model reporting services.

In exemplary embodiments, there is an apparatus comprising at least one memory configured to store computer program code and at least one hardware processor configured to access said computer program code and operate as instructed by said computer program code, said computer program code including model storage code configured cause the at least one hardware processor to store an artificial intelligence (AI) model, model serving code configured to cause the at least one hardware processor to load the AI model into a serving platform, model testing code configured to cause the at least one hardware processor to load and test a test unit against the AI model loaded into the serving platform, and monitoring and reporting code configured to cause the at least one hardware processor to collect reports from results of storing the AI model, loading the AI model into the serving platform and testing the test unit.

According to embodiments, the model storage code is further configured to cause the at least one hardware processor to remove the AI model from a storage.

According to embodiments, the model serving code is further configured to cause the at least one hardware processor to periodically fetch a plurality of AI models.

According to embodiments, the model serving code is further configured to cause the at least one hardware processor to periodically load the plurality of AI models into respective ones of a plurality of serving platforms.

According to embodiments, the monitoring code is further configured to cause the at least one hardware processor to store the reports in respective ones of a plurality of databases.

According to embodiments, the model storage code is configured to cause the at least one hardware processor to continuously check whether to store ones of a plurality of models.

According to embodiments, the model serving code is configured to cause the at least one hardware processor to continuously check whether to load ones of a plurality of models into the serving platform.

According to embodiments, the model serving code is configured to cause the at least one hardware processor to continuously check whether to load and test the test unit against ones of a plurality of models loaded into the serving platform.

According to embodiments, the model monitoring and reporting code is configured to cause the at least one hardware processor to continuously check whether to provide ones of a plurality of reports.

According to embodiments, the model monitoring and reporting code is configured to cause the at least one hardware processor to check whether to upgrade or to remove the AI model based on a result of testing the test unit against the AI model loaded into the serving platform.

BRIEF DESCRIPTION OF THE DRAWINGS

Further features, nature, and various advantages of the disclosed subject matter will be more apparent from the following detailed description and the accompanying drawings in which:

FIG. 4 is a schematic illustration of a simplified block diagram of a system in accordance with an embodiment.

DETAILED DESCRIPTION

Figure 1:
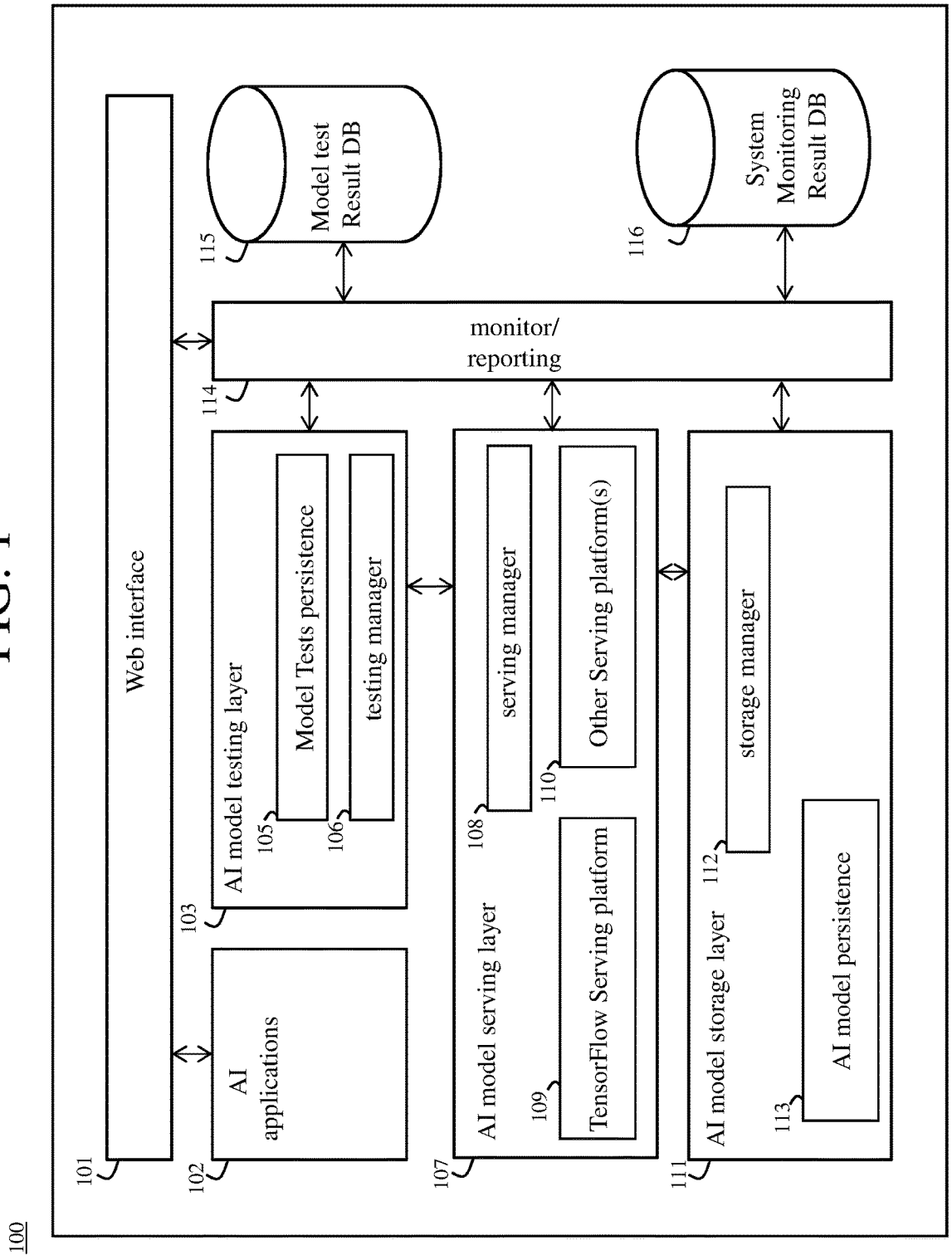
FIG. 1 is a schematic illustration of a simplified block diagram of a system in accordance with an embodiment.

FIG. 1 illustrates a simplified block diagram of a framework 100 according to an embodiment of the present disclosure. The framework 100 includes a web interface 101 as a presentation layer. The framework 100 also includes AI applications 102, and AI model testing layer 103, and AI model serving layer 107, an AI model storage layer 111 and a monitoring/reporting layer 114.

The AI model storage layer 111 may be used to manage a physical storage of one or more machine learning models and may guarantee the availability of the service and consistency of the model once the models are saved into this layer. As described further below, the AI model storage layer 111 may include a storage manager 112 that could be continuously running and may be responsible for adding new models to this layer and for removing existing models from this layer, and such models may be indicated by the AI model persistence block 113 in which TensorFlow models and other models may be available. Multiple commonly used persistence modes will be available including a plain file system, HDFS and Amazon S3. Of course, users could also provide their own storage mode as long as compliance is maintained with the common interfaces.

The AI model serving layer 107 may be used to serve AI models in real time. The serving manager 108 may be continuously running and may periodically communicate with the storage manager 112 to fetch all models to be served, including newly added models. The serving manager 108 is further configured to load ones of the fetched models into ones of the different serving platforms, such as the TensorFlow serving platform 109 and the other serving platform(s) 110 depending on the model types.

For each model, the model owner is responsible to create a model test unit, which includes the testing script, external resources, and logic to generate the test result for example. The AI model testing layer 103 may be used to store such AI model test units as part of the Model Tests persistence block 105 illustrated in FIG. 1, and a continuously running testing manager 106 may load all test units from the Model Tests persistence 105 and based on each test unit setup, test each model against the AI model serving layer 107.

The monitoring/reporting layer 114 may also be continuously running and may be responsible for monitoring the whole system, or framework 100, collecting reports from others of the AI model testing layer 103, AI model serving layer 107 and AI model storage layer 111 as well as a persistence function for all testing and/or monitoring results by storage in a corresponding one of the model test result database 115 and the system monitoring result database 116.

Figure 2A:
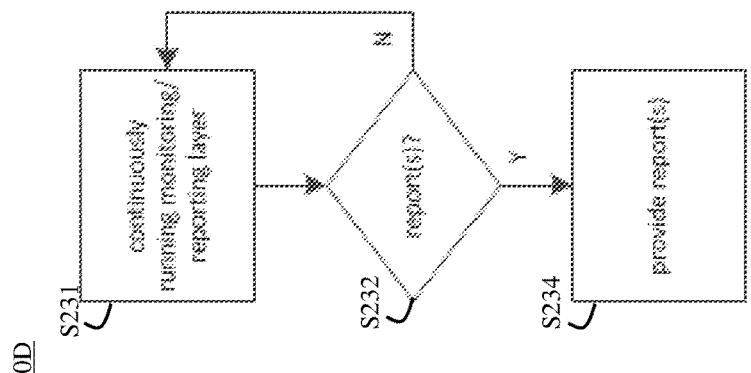
FIG. 2A is a schematic illustration of a simplified flow chart of a communication system in accordance with an embodiment.

FIG. 2A illustrates a flowchart 200A by which the AI model storage layer 111 may be implemented. At S201, a continuously running storage manager 112 may proceed to S202 and determine whether to add or remove one or more models as described above. If, at S202, the storage manager 112 determines to add or remove one or more of those models, then the storage manager 112 may proceed to S203 to do so. If, at S202, the storage manager 112 determines not to add or remove one or more of those models, then the storage manager 112 will continuously run again at S201.

Figure 2B:
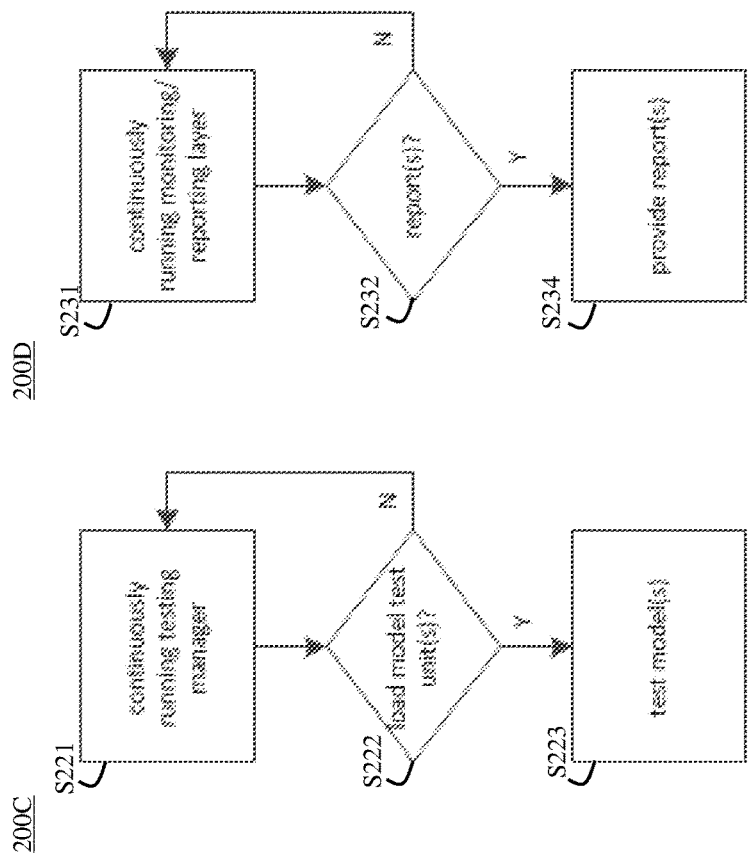
FIG. 2B is a schematic illustration of a simplified flow chart of a communication system in accordance with an embodiment.

FIG. 2B illustrates a flowchart 200B by which the AI model serving layer 107 may be implemented. At S211, a continuously running serving manager 108 may proceed to S212 and determine whether to fetch one or more models as described above. If, at S212, the serving manager 108 determines to fetch one or more of those models, then the serving manager 108 may proceed to S213 to do so. If, at S212, the serving manager 108 determines not to fetch one or more of those models, then the serving manager 108 will continuously run again at S211.

Figure 2C:
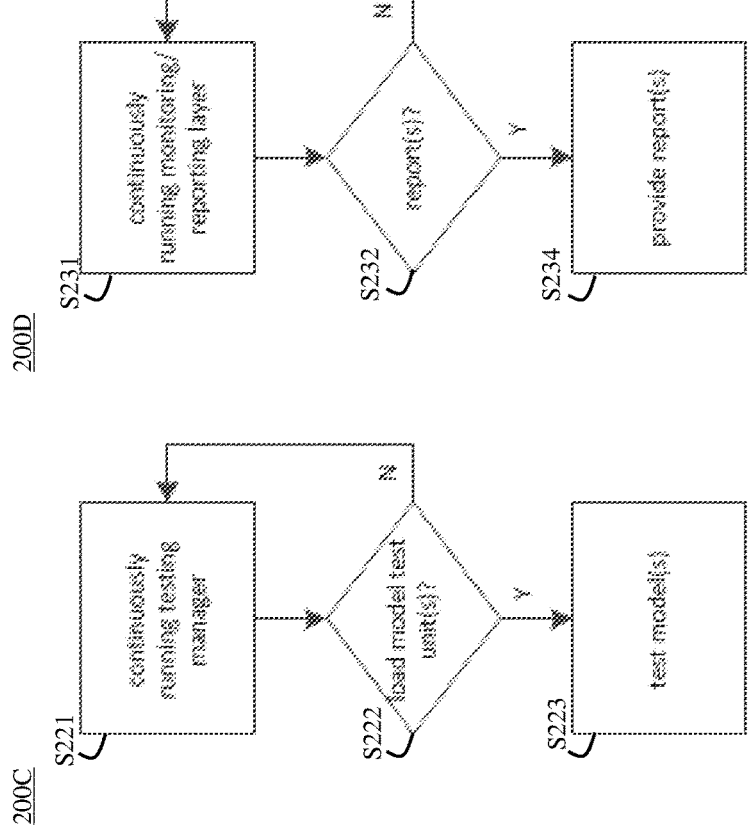
FIG. 2C is a schematic illustration of a simplified flow chart of a communication system in accordance with an embodiment.

FIG. 2C illustrates a flowchart 200C by which the AI model testing layer 103 may be implemented. At S221, a continuously running testing manager 106 may proceed to S222 and determine whether to load one or more model test units as described above. If, at S222, the testing manager 106 determines to load one or more model test units, then the testing manager 106 may proceed to S223 to do so. If, at S222, the testing manager 106 determines not to load one or more model test units, then the testing manager 106 will continuously run again at S221.

Figure 2D:
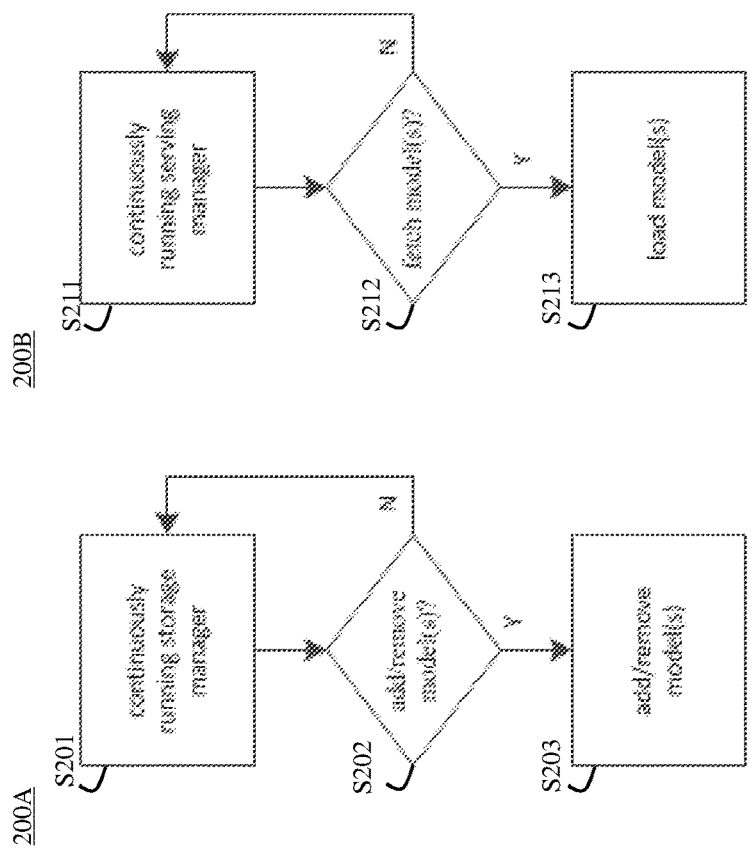
FIG. 2D is a schematic illustration of a simplified flow chart of a communication system in accordance with an embodiment.

FIG. 2D illustrates a flowchart 200D by which the monitoring/reporting layer 114 may be implemented. At S231, the monitoring/reporting layer 114 may proceed to S232 and determine whether provide any of collection of reports from other layers and/or some persistence function regarding testing or monitoring results as described above. If, at S232, the monitoring/reporting layer 114 determines provide any of collection of reports from other layers and/or some persistence function regarding testing or monitoring results, then the monitoring/reporting layer 114 may proceed to S223 to do so. If, at S232, the monitoring/reporting layer 114 determines not to load one or more model test units, then the monitoring/reporting layer 114 will continuously run again at S231.

Figure 3B:
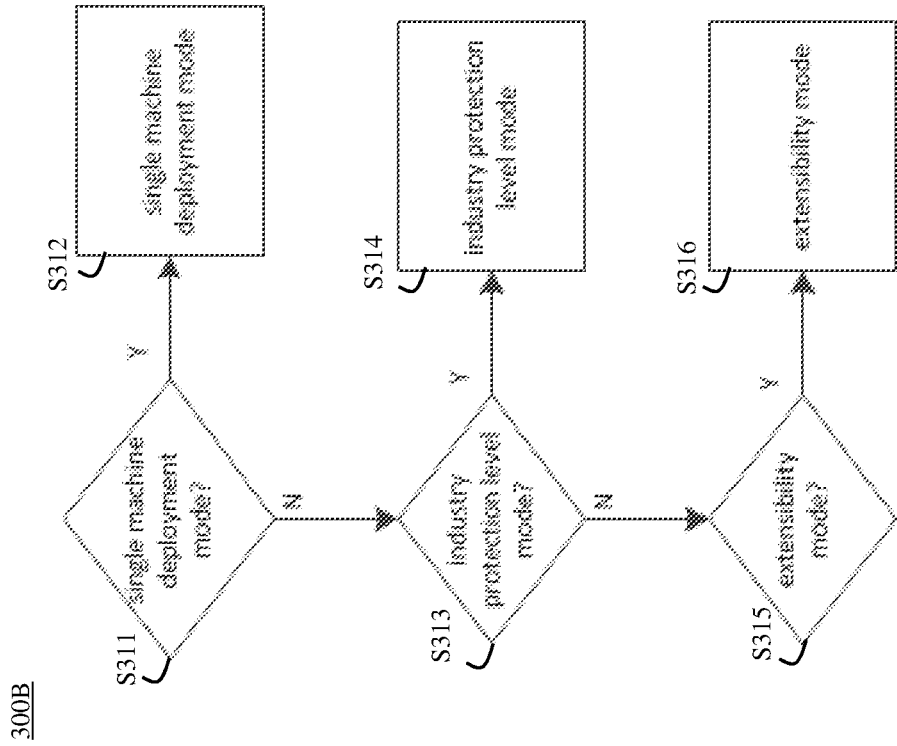
FIG. 3B is a schematic illustration of a simplified flow chart of a communication system in accordance with an embodiment.
Figure 3A:
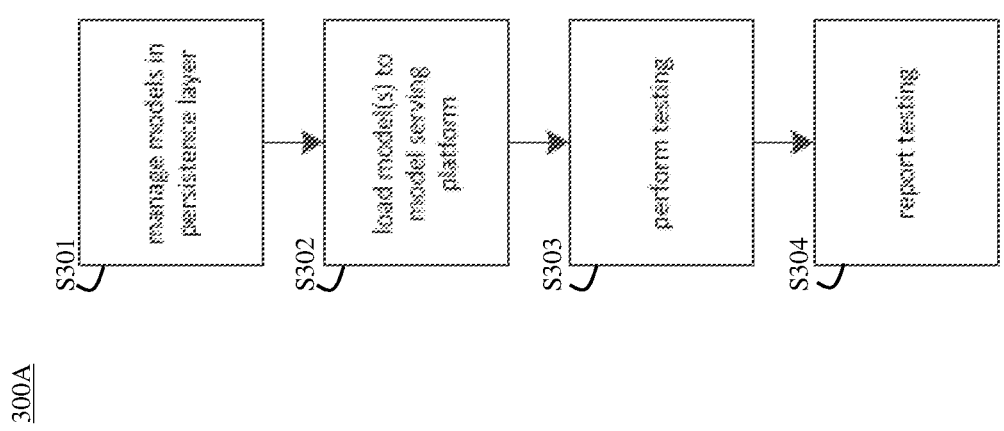
FIG. 3A is a schematic illustration of a simplified flow chart of a communication system in accordance with an embodiment.

FIG. 3A illustrates a flowchart 300A by which the framework 100 may be implemented. For example, there is a single framework 100 which could be used to manage a full life cycle of machine learning models, including a typical life-cycle of a newly trained machine learning model used by AI application: the new model, or the new version of the old model, is trained by an AI platform; passes functionality, integration testing, and, sometimes, performance testing, gets deployed to the production system; the production AI application could directly invoke the model or preferably through model serving platform, invoke the model indirectly. The framework 100 could include machine learning models are trained with different algorithm (Linear Regression, Bayes, Support Vector Machines, Convolutional Neural Networks, Recurrent Neural Network, etc.), using multiple platforms (TensorFlow, Café, Torch), and those models will be used by AI applications for various purposes and may be integrated in a same framework as described herein. For example, at S301, the framework 100 may manage existing and newly added models in a persistence layer. At S302, the framework 100 may load those models into a model serving platform. At S303, the framework 100 may perform unit testing, integration testing and/or at S304 report testing of various results.

According to exemplary embodiments, such framework 100 may be based on a pluggable configuration policy and test result to programmatically upgrade well performed new models to production use or to remove under-performed models from the serving platforms. Such framework 100 provides all the functionality mentioned above, without user intervention, once the customer saves the new model to the model repository and provides the model tests and configurable test result evaluation module.

FIG. 3B illustrates aspects of the framework 100 as an integration of full-life cycle machine learning model management functionalities in a single framework. For scalability, at S311 and S312, the framework provides a quick single machine deployment mode, in scale down scenario, for beginners to evaluate or build prove of concept project. Also, framework 100 may provide high scalability, such as at S313 and the high availability, industry production level mode of S314, in a distributed scale up scenario, for high demanding AI applications according to exemplary embodiments.

For extensibility, at S315 and S316, the framework 100 provides out-of-box typical usage modules for quick adoption and migration. Also, extensibility mode S316 will have a flexibility to let a customer specify and plugin their own modules, for example, own test result evaluation module, to fulfill unique requirements according to exemplary embodiments.

Through the full-life cycle of the AI model, comprehensive reporting and monitoring results will be recorded. Thus, data scientist and AI application owner will have the full picture of the model and understand the model thoroughly.

The techniques described herein, can be implemented as computer software using computer-readable instructions and physically stored in one or more computer-readable media. For example, FIG. 4 shows a computer system 400 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 4 for computer system 400 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 400.

Computer system 400 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 401, mouse 402, trackpad 403, touch screen 410, joystick 405, microphone 406, scanner 407, camera 408.

Computer system 400 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 410, or joystick 405, but there can also be tactile feedback devices that do not serve as input devices), audio output devices (such as: speakers 409, headphones (not depicted)), visual output devices (such as screens 410 to include CRT screens, LCD screens, plasma screens, OLED screens, each with or without touch-screen input capability, each with or without tactile feedback capability— some of which may be capable to output two dimensional visual output or more than three dimensional output through means such as stereographic output; virtual-reality glasses (not depicted), holographic displays and smoke tanks (not depicted)), and printers (not depicted).

Computer system 400 can also include human accessible storage devices and their associated media such as optical media including CD/DVD ROM/RW 420 with CD/DVD or the like media 421, thumb-drive 422, removable hard drive or solid state drive 423, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 400 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general-purpose data ports or peripheral buses (449) (such as, for example USB ports of the computer system 400; others are commonly integrated into the core of the computer system 400 by attachment to a system bus as described below (for example Ethernet interface into a PC computer system or cellular network interface into a smartphone computer system). Using any of these networks, computer system 400 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 440 of the computer system 400.

The core 440 can include one or more Central Processing Units (CPU) 441, Graphics Processing Units (GPU) 442, specialized programmable processing units in the form of Field Programmable Gate Areas (FPGA) 443, hardware accelerators for certain tasks 444, and so forth. These devices, along with Read-only memory (ROM) 145, Random-access memory 446, internal mass storage such as internal non-user accessible hard drives, SSDs, and the like 447, may be connected through a system bus 448. In some computer systems, the system bus 448 can be accessible in the form of one or more physical plugs to enable extensions by additional CPUs, GPU, and the like. The peripheral devices can be attached either directly to the core's system bus 448, or through a peripheral bus 449. Architectures for a peripheral bus include PCI, USB, and the like.

CPUs 441, GPUs 442, FPGAs 443, and accelerators 444 can execute certain instructions that, in combination, can make up the aforementioned computer code. That computer code can be stored in ROM 445 or RAM 446. Transitional data can be stored in RAM 446, whereas permanent data can be stored for example, in the internal mass storage 447. Fast storage and retrieve to any of the memory devices can be enabled through the use of cache memory, that can be closely associated with one or more CPU 441, GPU 442, mass storage 447, ROM 445, RAM 446, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 400, and specifically the core 440 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 440 that are of non-transitory nature, such as core-internal mass storage 447 or ROM 445. The software implementing various embodiments of the present disclosure can be stored in such devices and executed by core 440. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 446 and modifying such data structures according to the processes defined by the software. In addition or as an alternative, the computer system can provide functionality as a result of logic hardwired or otherwise embodied in a circuit (for example: accelerator 444), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:
1. An apparatus comprising
   at least one memory configured to store computer program code;
   at least one hardware processor configured to access said computer program code and operate as instructed by said computer program code, said computer program code including:
      model storage code configured to cause the at least one hardware processor to store an artificial intelligence (AI) model;
      model serving code configured to cause the at least one hardware processor to load the AI model into a serving platform;
      model testing code configured to cause the at least one hardware processor to load and test a test unit against the AI model loaded into the serving platform, the test unit including a testing script, external resources, and logic configured to generate a test result; and
      monitoring and reporting code configured to cause the at least one hardware processor to collect reports from results, including the test result, of storing the AI model, loading the AI model into the serving platform and testing the test unit.

2. The apparatus according to claim 1, wherein the model storage code is further configured to cause the at least one hardware processor to remove the AI model from a storage.

3. The apparatus according to claim 1, wherein the model serving code is further configured to cause the at least one hardware processor to periodically fetch a plurality of AI models.

4. The apparatus according to claim 3, wherein the model serving code is further configured to cause the at least one hardware processor to periodically load the plurality of AI models into respective ones of a plurality of serving platforms.

5. The apparatus according to claim 1, wherein the monitoring code is further configured to cause the at least one hardware processor to store the reports in respective ones of a plurality of databases.

6. The apparatus according to claim 1, wherein the model storage code is configured to cause the at least one hardware processor to continuously check whether to store ones of a plurality of models.

7. The apparatus according to claim 1, wherein the model serving code is configured to cause the at least one hardware processor to continuously check whether to load ones of a plurality of models into the serving platform.

8. The apparatus according to claim 1, wherein the model serving code is configured to cause the at least one hardware processor to continuously check whether to load and test the test unit against ones of a plurality of models loaded into the serving platform.

9. The apparatus according to claim 1, wherein the model monitoring and reporting code is configured to cause the at least one hardware processor to continuously check whether to provide ones of a plurality of reports.

10. The apparatus according to claim 1, wherein the model monitoring and reporting code is configured to cause the at least one hardware processor to check whether to upgrade or to remove the AI model based on a result of testing the test unit against the AI model loaded into the serving platform.

11. A method comprising implementing in a framework:
    storing an artificial intelligence (AI) model;
    loading the AI model into a serving platform;
    loading and testing a test unit against the AI model loaded into the serving platform, the test unit including a testing script, external resources, and logic configured to generate a test result; and collecting reports from results, including the test result, of storing the AI model, loading the AI model into the serving platform and testing the test unit.

12. The method according to claim 11, further comprising:
removing the AI model from a storage.

13. The method according to claim 11, further comprising:
periodically fetching a plurality of AI models.

14. The method according to claim 13, further comprising:
periodically loading the plurality of AI models into respective ones of a plurality of serving platforms.

15. The method according to claim 11, further comprising:
storing the reports in respective ones of a plurality of databases.

16. The method according to claim 11, further comprising:
continuously checking whether to store ones of a plurality of models.

17. The method according to claim 11, further comprising:
continuously checking whether to load ones of a plurality of models into the serving platform.

18. The method according to claim 11, further comprising:
continuously checking whether to load and test the test unit against ones of a plurality of models loaded into the serving platform.

19. The method according to claim 11, further comprising:
continuously checking whether to provide ones of a plurality of reports.

20. A non-transitory computer readable medium storing a program causing a computer to execute a process, the process comprising:
storing an artificial intelligence (AI) model;
loading the AI model into a serving platform;
loading and testing a test unit against the AI model loaded into the serving platform, the test unit including a testing script, external resources, and logic configured to generate a test result; and
collecting reports from results, including the test result, of storing the AI model, loading the AI model into the serving platform and testing the test unit.

* * * * *